Aug. 21, 1928.

F. EATON 1,681,763

SHEAR SHARPENER VISE

Filed April 26, 1926

Witness
L. F. Sandberg

Inventor
Frank Eaton
by Bair & Freeman Attorneys

Patented Aug. 21, 1928.

1,681,763

UNITED STATES PATENT OFFICE.

FRANK EATON, OF DES MOINES, IOWA.

SHEAR-SHARPENER VISE.

Application filed April 26, 1926. Serial No. 104,786.

The object of my invention is to provide a simple, durable and comparatively inexpensive vise whereby shears may be sharpened and the proper beveled edge applied to the shears.

Still a further object is to provide a guide for the file wherein the movement across the edge of the shears may be uniform and in a straight line across the edge itself.

Still a further object is to provide a guide member for the file which may be adjusted to different heights, thus permitting the "bevel" upon the shear to be varied as desired.

Still a further object is to provide a clamp for retaining the shears in proper position for filing, one side of the clamp being higher than the other so that as the shears are ground or filed at the outer edge, the angle of the bevel is changed so that when both of the shear members are brought into contact with each other, a sharper cutting edge is had.

Figure 1:
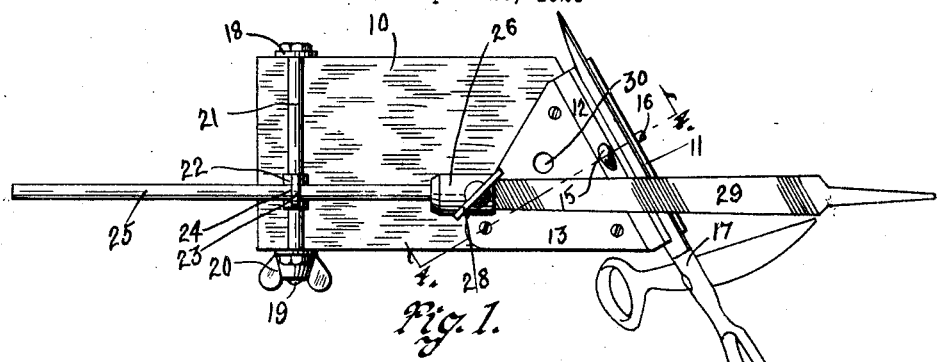

With these and other objects in view, my invention consists in the construction, arrangement and combination of the various parts of my invention, whereby the objects contemplated are attained, as hereinafter more fully set forth, pointed out in my claims, and illustrated in the accompanying drawings, in which:

Fig. 1 is a top plan view of my improved shear sharpener vise with parts in operative position.

Figure 2:
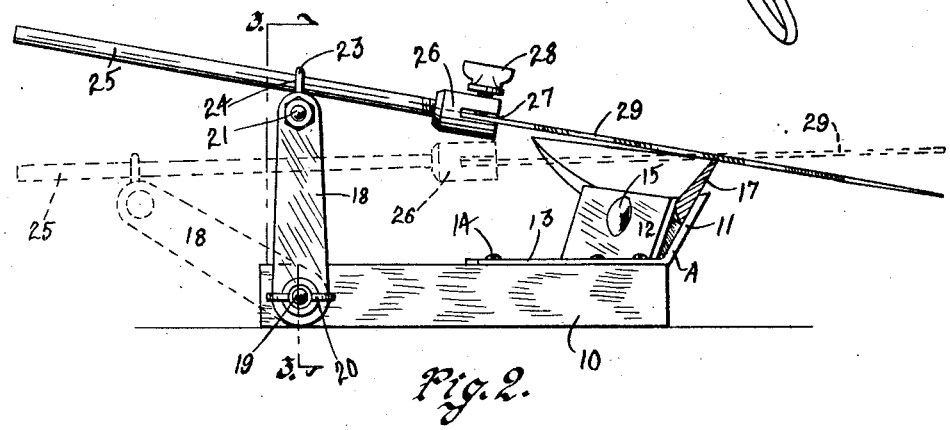

Figure 2 is a side view of the same, one position of the guide for the file being shown in dotted lines.

Figure 3:
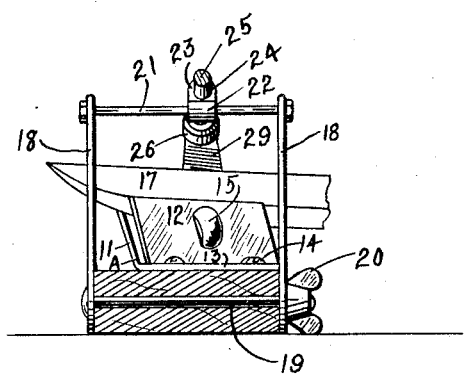

Figure 3 is a vertical sectional view taken on line 3—3 of Figure 2, and

Figure 4:
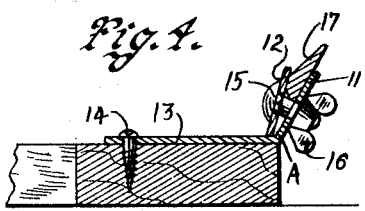

Figure 4 is a detail sectional view taken on line 4—4 of Figure 1.

In the accompanying drawings I have used the reference numeral 10 to indicate generally a base for my shear sharpener vise, which may be of wood or other suitable material.

Mounted on the base 10 is a clamping device A made of two parts 11 and 12. The part 11 includes a flat horizontally arranged fastening flange 13 which is secured to the base 10 by screws or the like 14.

One end of the base 10 is arranged at an angle so that the clamp device A when placed upon the base is also at an angle as shown in Figure 1 of the drawings.

The member 12 of the clamp device A is positioned substantially along the side of the member 11 and these two parts are connected together by a bolt 15 having a thumb nut 16 thereon whereby a pair of shears 17 may be positioned between the members 11 and 12 and securely held in position therebetween by tightening the bolt 15 and nut 16.

The shears 17 are mounted in the clamp device A as has just been described and as shown in Figures 1 and 2 of the drawings.

It will be noted that the members 11 and 12 are arranged at an angle so that when the shears 17 are mounted therebetween they are also at an angle and this gives me the proper angle or bevel for the cutting edge of the shears.

A guide is necessary in order to insure a proper edge for the shears and my guide device includes a pair of upright arms 18 pivotally mounted upon a bolt 19 extending through the base 10 from side to side.

The rod 19 has a threaded end upon which is mounted the thumb nut 20 so that the arms 18 may be frictionally engaged and locked in any pivoted position against the base 10.

Extending through the upper ends of the arms 18 and connecting them together is a guide rod 21. Slidably mounted upon the guide rod 21 between the arms 18 is a sleeve 22 having an upwardly extending flange 23 formed thereon.

The flange 23 has an opening 24 therein. Extending through the opening 24 is a rod 25 having a fitting 26 at one end provided with a notch or slot 27.

A thumb nut 28 is mounted in the fitting 26 and adapted to project into the slot 27. A file 29 is arranged to project into the slot 27 and to be securely fixed to the fitting 26 by the thumb nut 28.

From the construction of the parts just described it will be seen that the file 29 and the rod 25 when connected together form a single element which is movable back and forth across the cutting edge of the shears 17.

In the practical operation of my device the shears are placed in position in the clamp device A and the file secured to the rod 25. The file may be pushed and pulled across the cutting edge of the shears and the particular bevel upon the shears may be governed by adjusting the position of the guide rod 21.

The sleeve 22 travels longitudinally on the rod 21 and as the file is operated closer to the end of the shears the sleeve travels toward one side of the entire device. The sleeve 22 is free to travel upon the rod 21.

The arms 18 may be raised or lowered so that the particular height of the guide rod 21 may be varied as desired.

The clamping device A has its upper edge slightly inclined so that when the shears are mounted therein and when the filing is done near the free end of the shears then the bevel is slightly greater so as to insure a keen cutting edge.

The entire vise may be mounted upon a support of any kind and an opening 30 is provided for this purpose in the base 10.

The advantage of my construction resides in the movable sleeve 22 upon the guide rod 21 wherein the file may be guided as the same is drawn over the edge of the shears.

The same angle or bevel is had whether the filing is done close to the pivot point of the shears or at the outer point of the shears due to the fact that the sleeve 22 shifts longitudinally upon the rod 21.

The varying of the height of the guide rod 21 enables me to put different beveled edges upon the shears and when the parts are once adjusted the edge placed upon the shears will be uniform.

Some changes may be made in the construction and arrangement of the various parts of my invention, without departing from the real spirit and purpose of my invention, and it is my intention to cover by my claims, any modified forms of structure or use of mechanical equivalents, which may be reasonably included within their scope.

I claim as my invention:

1. In a device of the class described, a base, a vise mounted upon one end thereof adapted to receive a pair of shears, a file guide mounted upon the other end of said base, said file guide including a transverse guide rod, a sleeve thereon whereby a file may be guided from one side of the device to the other side thereof, a pair of arms carrying said rod, the lower ends of said arms being pivoted to said base on a rod extending through the base and the arms, a head on one end of said rod and a nut on the other end, both of which bear against the arms on said bolt whereby the height of the guide rod above the base may be adjusted by adjusting the angle of said arms.

2. A shear sharpening device comprising a base, a vise mounted on one end thereof and arranged at an angle relative to the sides of the base, a guide rod extending across said base from side to side, a sleeve thereon capable of movement from one end of said guide rod to the other end thereof, a file engaging rod slidably mounted relative to said sleeve, said file engaging rod including a fitting adapted to be secured to one end of a file, said guide rod being supported by arms which are pivotally mounted above the base and are capable of being moved to various angles relative to the base and a bolt extending through said base and said arms for locking said guide rod in any of its adjusted positions, said bolt having a nut thereon which, when tightened causes the arms to frictionally engage the sides of the base.

Des Moines, Iowa, April 19, 1926.

FRANK EATON.